United States Patent [19]

Horsch

[11] Patent Number: 4,834,228

[45] Date of Patent: May 30, 1989

[54] CLUTCH ASSEMBLY FOR A TRACTOR

[75] Inventor: Joachim Horsch, Lombard, Ill.

[73] Assignee: J. I. Case Company, Racine, Wis.

[21] Appl. No.: 138,201

[22] Filed: Dec. 28, 1987

[51] Int. Cl.$^4$ .......................................... F16D 25/063
[52] U.S. Cl. ............................ 192/70.28; 192/85 AA
[58] Field of Search ............ 192/85 AA, 70.28, 87.11, 192/20

[56] References Cited

U.S. PATENT DOCUMENTS

| | | | |
|---|---|---|---|
| 3,142,195 | 7/1964 | Henyon | 192/85 AA |
| 3,182,777 | 5/1965 | Browning et al. | 192/85 AA X |
| 3,291,273 | 12/1966 | Hansen | 192/85 AA |
| 3,613,848 | 10/1971 | Reiff | 192/70.28 |
| 4,090,597 | 5/1978 | Folomin et al. | 192/85 AA |
| 4,231,457 | 11/1980 | Cornish | 192/85 AA |
| 4,421,218 | 12/1983 | Haight | 192/85 AA X |
| 4,541,515 | 9/1985 | Nishimura et al. | 192/85 AA |
| 4,667,796 | 5/1987 | Uchibaba | 192/85 AA |

FOREIGN PATENT DOCUMENTS 3529234  3/1986  Fed. Rep. of Germany ........ 192/85 AA Primary Examiner—Rodney H. Bonck
Attorney, Agent, or Firm—Dressler, Goldsmith, Shore Sutker & Milnamow, Ltd.

[57] ABSTRACT

A clutch assembly is provided in a tractor for selectively establishing and disestablishing a drive connection between a pair of relatively rotatable members. The clutch assembly includes a series of interleaved elements operably effective when axially compressed to couple the rotatable members of the tractor. A clutch actuator is provided for regulating the operable effectiveness of the clutch assembly. The present invention contemplates arranging the clutch actuator in a fluid receiving chamber provided in the driven rotational member. To effect these ends, the driven rotational member is arranged adjacent a stationary extension of a tractor housing. Fluid passageways are provided in such extension and in the driven rotational member for permitting a supply of fluid pressure to be transmitted to the fluid receiving chamber. Such passageway includes a rotating joint between the rotating member and the stationary extension.

8 Claims, 1 Drawing Sheet

CLUTCH ASSEMBLY FOR A TRACTOR

TECHNICAL FIELD

The present invention relates to a fluid pressure actuated clutch mechanism for controlling relative rotation between two rotational members, and more particularly, to a clutch assembly arranged to avoid inadvertent self-actuation by centrifugal pressurization of hydraulic fluid in the assembly.

BACKGROUND OF THE INVENTION

In many applications, and more particularly in the case of multiple ratio gear drives, one or more clutch assemblies are provided to control the relative rotational state between two rotational members; i.e., a shaft and a gear. Such clutch assemblies have a plurality of interleaved plates alternate ones of which rotate with one rotational member and the remainder of which rotate with the other rotational member. These interleaved plates establish and disestablish a drive connection between the rotating members as a function of the axial compression of such plates by a clutch actuator.

In most designs, the clutch actuator includes an annular, fluid responsive piston received in a piston chamber and which is operative to apply a compressive force to the interleaved plates. Moreover, such clutch assemblies are normally designed with a hydraulic piston housing that is connected to the rotating input member or shaft of the clutch assembly. The other rotational member or gear to be driven is normally supported for free rotation on bearings on the shaft. Axially extending fluid passageways are provided in the shaft to supply pressurized fluid to the hydraulic piston chamber.

Such designs, however, have serious drawbacks. Under certain conditions, the rotational input speeds imparted to the shaft may be very high. Because the piston housing is affixed to the shaft, these same high-speed rotational inputs are imparted to the piston housing even though the clutch is disengaged. This can undesirably result in "self-actuation" of the clutch assembly by inducing centrifugal pressurization of fluids in the piston housing. Self-actuation of the clutch assembly may result in inadvertent engagement of the clutch which could undesirably lead to transmission "lock-up" by simultaneous engagement of two different gear ratios, and potential damage to the transmission. Given such conditions, extremely high return spring forces would be required to maintain the clutch assembly in a disengaged mode of operation, thus mandating correspondingly high actuation pressures, and complicating clutch assembly and maintenance.

SUMMARY OF THE INVENTION

In view of the above, and in accordance with the present invention, there is provided a clutch assembly design that negates centrifugal fluid pressure forces associated with high-speed rotational inputs and has no adverse effect on shaft design. The present invention contemplates arranging the clutch design such that the clutch actuator is housed within the driven rotating member, whereby the adverse effect of high-speed rotational inputs creating centrifugal pressure is eliminated. As such, inadvertent clutch engagement and associated operational problems are furthermore eliminated.

The improved clutch assembly is typically provided in a tractor apparatus for coupling/uncoupling in power transmitting relationship a pair of relatively rotatable members of the tractor transmission. Such rotatable members usually define driving and driven parts within the tractor apparatus.

The clutch assembly includes a series of interleaved plates operably effective when axially compressed to couple the first and second members of the apparatus. A clutch actuator is provided for regulating the operable effectiveness of the clutch assembly. Unlike other clutch designs, however, the present invention contemplates arranging the pressure-responsive clutch actuator in a fluid receiving chamber provided in the driven rotating member of the transmission apparatus.

Suitable resilient means may be provided for controlling the disposition of the clutch actuator depending on the function thereof. By arranging the actuating piston or member within the driven rotatable member rather than within the high-speed rotational input drive member, the above-described "self-actuation" phenomenon is eliminated. To effect these ends, the driven rotatable member is arranged adjacent a stationary extension on a housing of the apparatus. Fluid passageways are provided in such extension and in the rotating member for permitting a supply fluid pressure to be transmitted to the fluid receiving chamber. Such passageways include a rotating joint between the rotating member and the stationary extension.

BRIEF DESCRIPTION OF THE DRAWINGS

Other features and advantages of the present invention will become readily apparent from the following detailed description, the appended drawings, and the accompanying claims.

DETAILED DESCRIPTION

Figure 1:
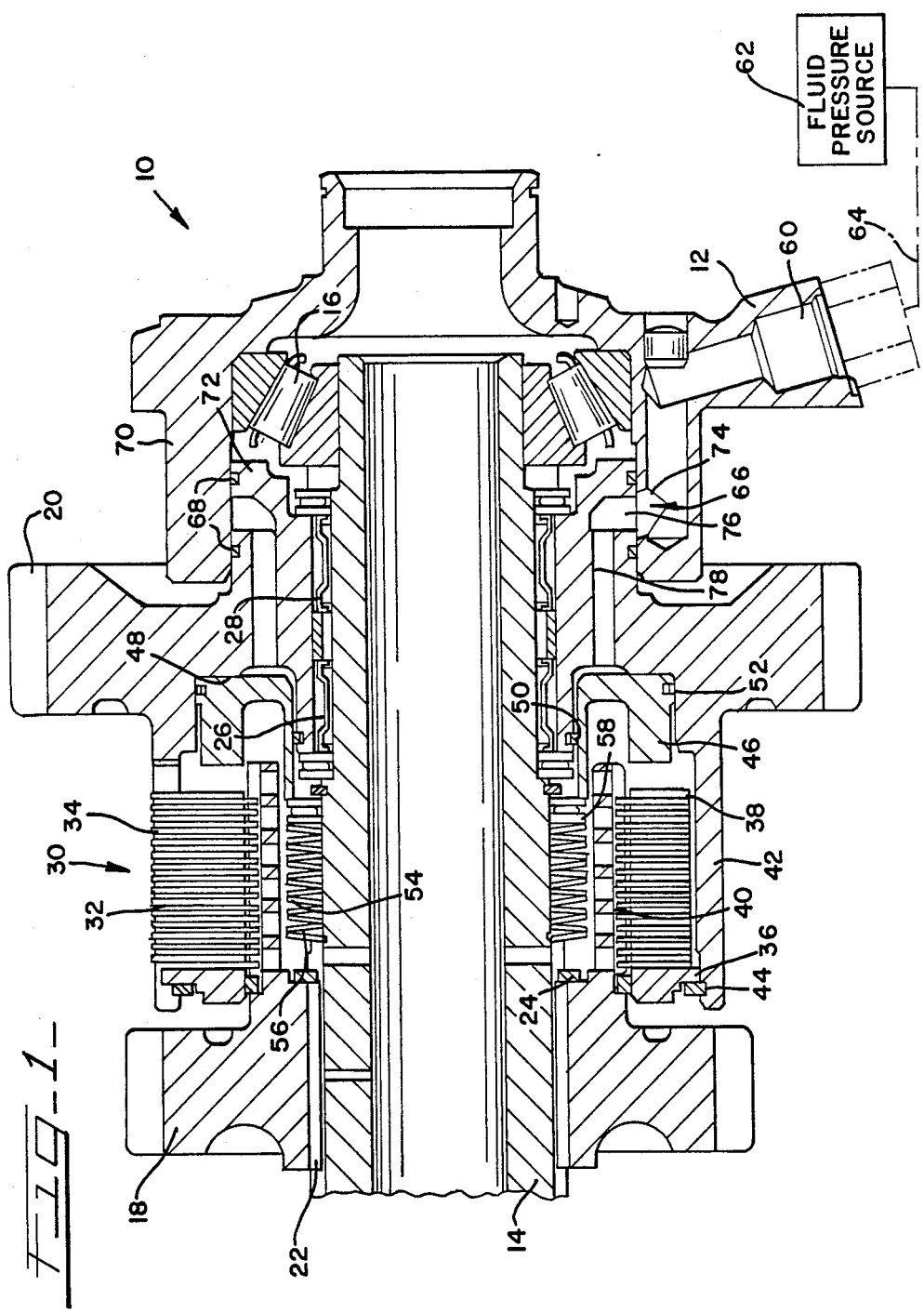
FIG. 1 is a longitudinal sectional view of a mechanism having a clutch assembly embodying the principles of the present invention.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring now to the drawing, a clutch-driven unit or assembly embodying the principles of this invention is shown incorporated in a transmission apparatus 10, such as for a tractor, typically including a plurality of selectable gear trains to provide a variety of torque-multiplying gear ratios. As illustrated, the apparatus 10 includes a stationary housing 12 having a shaft 14 journalled for rotation relative to the housing. Suitable bearing means 16 may be provided to rotatably support the shaft.

Arranged in axially spaced relation on the shaft 14 are two rotatable members 18 and 20. In this embodiment, both members 18 and 20 are illustrated as gears forming part of a gear train. Gear 18 may be operably connected to shaft 14 as by a spline connection 22 such that it rotates with the shaft 14. A snap-ring 24 axially locates gear 18 on shaft 14. The other member or gear 20 is rotatably arranged on shaft 14 by bearing means. In the illustrated embodiment, such bearing means includes axially spaced bearing sets 26 and 28.

A friction clutch assembly 30 provides a friction coupling between shaft 14 and rotatable member 20. The clutch assembly 30 includes a pack of interleaved friction disks or plates 32 and 34 which are arranged between a back pressure plate 36 and a pressure plate 38. Friction disks 32 are connected to an elongated splined portion or axial extension 40 of member 18 such that they rotate with shaft 14. Similarly, alternate disks or plates 34 are connected to elongated splines provided on an axial extension 42 of member 20. The back pressure plate 36 is likewise carried by the elongated section 42 of rotatable member 20 and is axially located thereon by a suitable limit stop or snap-ring 44. The pressure plate 38 is similarly arranged on the other end of the clutch pack but is provided for substantially free linear movement. One group of the plates 32 or 34 may be provided with a friction facing material which is selected in combination with a lubricating fluid to provide a predetermined coefficient of friction between the plates or disks 32, 34. When sufficient axial pressure is applied to the plates or disks, a drive connection is established and motion is transmitted between shaft 14 and rotatable member 20. As will be understood, torque transfer and rotation between shaft 14 and member 20 is controlled as a function of the axial compression of the friction elements as determined from the amount or level of pressure applied to the clutch assembly.

As illustrated, an annular piston 46 applies an axial compressive force against one end of the clutch assembly 30. The clutch actuator or piston 46 rotates with member 20 and is mounted for axial displacement in an expandable piston chamber 48 provided in member 20. The piston or actuator 46 is appropriately sealed to retain hydraulic pressure rearward thereof in the chamber 48 as by means of a pair of conventional annular oil seals 50 and 52. A series of annular, dished resilient members or springs 54 are arranged between the piston 46 and a step or shoulder 56 defined on shaft 14 as by one end of spline 22. Bearing means 58, in the form of a thrust washer assembly, is provided between the piston 46 and the biasing means 54 to permit relative rotation therebetween. By such construction, piston 46 is normally urged to the right, as seen in FIG. 1, into a non-engaging position. It should be appreciated, however, that given a slight re-design effort, piston 46 may be employed as the means for non-engaging a spring biased clutch assembly.

The fluid receiving chamber 48 provided in rotatable member 20 is communicable with a fluid supply conduit or control passage 60 provided in the stationary housing 12. As illustrated, one end of the supply conduit 60 is connectable to a fluid supply source 62 through suitable conduit means 64. Suffice it to say, the fluid supply source delivers a regulated or controlled fluid pressure to the supply conduit 60. The other end of the control passage 60 opens to a rotating joint 66 sealed on opposite sides by a pair of spaced sealing rings 68 of conventional design. The sealing rings 68 are provided to prevent fluid leakage between the relative rotary surfaces of rotational gear member 20 and stationary housing 12.

In the preferred embodiment, housing 12 includes an annular extension 70 telescopically arranged about a cylindrical extension 72 provided on rotating member 20. Given this construction, the rotating joint 66 is defined by a radial port 74 provided in housing 12 leading from passage 60. The radial port 74 opens to an annular passage 76 provided on the axially extending cylindrical portion 72 of the rotating member 20. Suitable conduit means 78 connect the annular passage 76 with the fluid receiving chamber 48. By such construction, a fluid flow path is established between the source of fluid 62 and the fluid receiving chamber 48.

Depending on the particular application, shaft 14 or rotating member 20 may serve as the input drive member to the apparatus. For purposes of this description, it will be assumed that shaft 14 is the input drive member to the mechanism. Rotary motion may be imparted to the shaft 14 in any of a variety of ways including through rotary member 18. When shaft 14 is rotated, rotary member or gear 18 rotates therewith. As a result, plates or disks 32 are also rotated therewith. Rotary motion from either shaft 14 or rotary member 18 may be transmitted to member 20 through the clutch assembly 30. The ratio of input drive speed to output drive speed is determined by the axial compression force imparted against the clutch assembly 30 by piston 46. Of course, the degree of axial compression force is determined by the amount of fluid pressure in the expandable chamber 48. Fluid for establishing pressure in chamber 48 is supplied from the supply source 62 across the rotating joint 66. Since fluid is transferred over a rotating joint, no additional bearings are required to isolate parts with relative rotation. When the pressure in chamber 48 is reduced below a predetermined pressure, biasing means 54 serve to disengage the clutch assembly. As such, no rotary motion will be transmitted between the input drive member 14 and the output rotational member 20.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

Thus, having adequately described my invention, what I claim is:

1. A hydraulically operated clutch assembly comprising:
    a stationary housing having a fluid supply conduit;
    a driven member rotatably arranged relative to and adjacent said housing;
    a drive member rotatably arranged relative to said housing and said driven member;
    clutch means for selectively establishing and disestablishing a drive connection between said drive and driven members;
    a fluid pressure operated clutch actuator for effecting operation of said clutch means to drivingly connect said drive and driven members, said actuator being enclosed within a fluid receiving chamber defined by said driven rotatable member and which is communicable with said fluid supply conduit provided in said housing;
    at least one resilient member radially spaced from said clutch means for normally biasing the clutch actuator away from the clutch means, with opposite ends of said resilient member respectively acting against said clutch actuator and said drive member; and
    means arranged in combination with said resilient member for allowing relative rotation between said resilient member and said clutch actuator.

2. The clutch assembly of claim 1 wherein said clutch means includes a plurality of interleaved friction engaging elements for establishing and disestablishing a drive connection between said first and second members as a function of the axial compression of said elements.

3. The clutch assembly of claim 1 wherein one of said drive and driven members is a rotatably arranged shaft and the other of said drive and driven members is a gear arranged for rotation on said shaft.

4. The clutch assembly of claim 3 wherein said gear includes fluid passageway means providing a fluid flow path extending between the fluid receiving chamber and the fluid supply conduit in said stationary housing.

5. A clutch-driven apparatus comprising:
 a stationary housing;
 a shaft journalled for rotation relative said housing;
 a rotatable member coaxially and rotatably arranged on said shaft adjacent said housing;
 clutch assembly means disposed between said shaft and said rotatable member and including a plurality of interleaved friction elements for effectively coupling said member with said shaft, some of said friction elements being rotatable with said shaft and the remainder of said friction elements being rotatable with said member;
 a piston arranged for axial displacement in a fluid receiving chamber provided in said rotatable member and which is communicable with a fluid supply conduit provided in said housing, said piston being responsive to introduction of fluid to said chamber for influencing the operable effectiveness of said clutch assembly means;
 a series of springs radially spaced from said clutch assembly means and rotatable with said shaft for normally biasing said piston away from said clutch assembly; and
 bearing means interposed between said springs and said piston for permitting relative rotation therebetween.

6. The tractor apparatus of claim 5 wherein said rotatable member is a gear rotatably supported on said shaft by bearing means.

7. The tractor apparatus of claim 5 wherein said member includes fluid conduit means for connecting the fluid receiving chamber with the fluid supply conduit provided in said housing.

8. The tractor apparatus of claim 7 wherein said fluid conduit means includes a rotating joint sealed on opposite sides by annular rings.

* * * * *